United States Patent
Yoshikawa et al.

(10) Patent No.: US 7,261,421 B2
(45) Date of Patent: Aug. 28, 2007

(54) OPTICAL PROJECTOR AND IMAGE DISPLAY APPARATUS USING THE SAME

(75) Inventors: Hiroki Yoshikawa, Hiratsuka (JP); Tetsu Ohishi, Hiratsuka (JP); Koji Hirata, Yokohama (JP); Daisuke Imafuku, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/922,706

(22) Filed: Aug. 20, 2004

(65) Prior Publication Data
US 2005/0134813 A1    Jun. 23, 2005

(30) Foreign Application Priority Data
Dec. 19, 2003 (JP) ............................. 2003-421959
Apr. 28, 2004 (JP) ............................. 2004-132481

(51) Int. Cl.
*G03B 21/14* (2006.01)
(52) U.S. Cl. ............................. 353/31; 353/122; 349/5
(58) Field of Classification Search ................ 353/20, 353/31, 33, 34, 37, 122; 349/5, 7, 8, 9; 359/64, 359/112
See application file for complete search history.

(56) References Cited

U.S. PATENT DOCUMENTS

| | | | |
|---|---|---|---|
| 4,088,400 A * | 5/1978 | Assouline et al. | 353/20 |
| 5,754,260 A * | 5/1998 | Ooi et al. | 349/10 |
| 6,384,884 B1 * | 5/2002 | Nakamura et al. | 349/113 |
| 6,404,471 B1 * | 6/2002 | Hatanaka et al. | 349/113 |
| 6,473,209 B1 * | 10/2002 | Popovich | 359/22 |
| 6,483,613 B1 * | 11/2002 | Woodgate et al. | 359/19 |
| 6,594,090 B2 * | 7/2003 | Kruschwitz et al. | 359/707 |
| 6,744,480 B2 * | 6/2004 | Kaneko | 349/65 |
| 6,891,672 B2 * | 5/2005 | Whitehead et al. | 359/443 |
| 6,906,767 B1 * | 6/2005 | Iijima | 349/113 |
| 6,917,355 B1 * | 7/2005 | Fergason | 345/107 |
| 6,924,849 B1 * | 8/2005 | Clifton et al. | 349/5 |
| 7,079,205 B2 * | 7/2006 | Kuji | 349/112 |
| 2003/0189692 A1 * | 10/2003 | Kawano et al. | 353/31 |
| 2004/0046940 A1 * | 3/2004 | Yanagisawa | 353/31 |

FOREIGN PATENT DOCUMENTS

| | | |
|---|---|---|
| JP | 07-168282 | 7/1995 |
| JP | 10-288954 | * 10/1998 |
| JP | 11-038512 | 2/1999 |
| JP | 2001-228547 | 8/2001 |

* cited by examiner

*Primary Examiner*—William C. Dowling
(74) *Attorney, Agent, or Firm*—Townsend and Townsend and Crew LLP (57) ABSTRACT

Image disturbance called speckle noise occurs when an image generator has a small effective screen size and a projection lens has a small effective diameter. The present invention is intended to reduce speckle noise. In an optical projector, a viewing angle enlarging ember (60) for enlarging viewing angle or a scattering member (28) for scattering image light is disposed near an image display device (18), such as a liquid crystal panel. Speckle noise can be reduced, suppressing the deterioration of resolution and contrast.

19 Claims, 9 Drawing Sheets

OPTICAL PROJECTOR AND IMAGE DISPLAY APPARATUS USING THE SAME

CLAIM OF PRIORITY

The present application claims priority from Japanese applications serial no. P2003-421959, filed on Dec. 19, 2003, and serial no. P2004-132481, filed on Apr. 28, 2004, the contents of which are hereby incorporated by reference into this application.

BACKGROUND OF THE INVENTION

The present invention relates to an image display apparatus capable of enlarging and displaying an image produced by an image display device as an image generator on a screen by using optical parts including a projection lens, and an optical projector to be used in combination with the image display apparatus.

Recently, the so-called pixel-selection type image modulators, such as liquid crystal panels, have become prevalently used instead of projection cathode-ray tubes as image generators for projection image display apparatus. The image modulator, for example, forms an image by modulating light emitted by a light source, such as a mercury lamp, for each pixel. The effective screen size of the image modulator is as small as about 1 inch. The image modulator emits light closer to collimated light than that emitted by a projection cathode-ray tube. Therefore, a projection lens to be incorporated into the image modulator is small and has a large f-number, which is the ratio of the lens's focal length to the lens's maximum effective diameter. If the incident light on the lens is nearly collimated light, the speed of the lens is high even if the effective diameter D of the lens is small.

If the effective screen size of the image generator is small and the effective diameter D of the projection lens is small, image disturbance generally called speckle noise (scintillation) occurs; that is, the projection image display apparatus employing the image modulator is liable to generate speckle noise. Techniques intended to reduce speckle noise are disclosed in, for example, Japanese Patent Laid-Open Nos. 2001-228547 (Reference 1), Hei 7-168282 (Reference 2) and Hei 11-38512 (Reference 3).

SUMMARY OF THE INVENTION

Speckle noise occurs when light rays scattered by spatially separate minute diffusing elements interfere with each other at a point. In other words, since light emitted from an optional single point on the image generator passes two points on a screen and interfere with each other, the interference becomes more intense and the contrast of speckle noise becomes higher when the image generator is smaller and the surface density of outgoing light is greater; that is, the smaller the effective diameter D of the lens becomes, the higher the intensity of the interference is.

Accordingly, speckle noise can be reduced by increasing the effective screen size of the image generator or by using a lens having a large effective diameter D, which, however, runs counter to the trend toward using the image modulator as the image generator. Therefore, measures have been taken to avoid interference between light rays emitted from two points on the screen or to diffuse the interfering light rays into white noise by further diffusion.

A method of avoiding interference between light rays emitted from two points on the screen mentioned in Reference 2 forms a lenticular lens sheet included in a rear projection screen of a material not containing any diffusing material, and disposes a diffusing layer at distance longer than about three times the focal length of the lenticular lens from the lenticular lens sheet. Thus the lenticular lens increases the directions of light rays falling on the diffusing material and causing speckle noise to avoid interference. Although this method is effective in eliminating causes of speckle noise, the diffusing layer needs to be disposed at a distance longer than about three times the focal length of the lenticular lens from the lenticular lens sheet. Consequently, resolution is deteriorated greatly, which is a new problem.

A method of converting the interfering light rays into white noise by further diffusion mentioned in Reference 3 uses a lenticular lens sheet of three-layer construction formed by sandwiching a transparent middle layer between first and second diffusing layers. Speckle noise generated by the first diffusing layer is concealed by the third diffusing layer. This method not only deteriorates resolution but also makes the second diffusing layer on the front side look white when external light falls thereon and decreases contrast in a bright place.

Accordingly it is important to reduce speckle noise that is caused or liable to be caused in an image display apparatus by an image modulator as an image generator, and a projection lens having a large f-number included in the image display apparatus, suppressing the deterioration of resolution and contrast.

The present invention has been made in view of the foregoing problems and it is therefore an object of the present invention to provide techniques capable of satisfactorily suppressing the deterioration of image quality when an image modulator is used as an image generator.

The present invention provides, to achieve the object, an image display apparatus including an image display device and characterized by a viewing angle enlarging film disposed on one side of the image display device or by viewing angle enlarging films disposed on the opposite sides of the image display device, respectively, to correct image light such that viewing angle is enlarged. The viewing angle enlarging films may be viewing angle compensating films having different refractive indices with the P-wave and the S-wave, namely, birefringent films.

According to the present invention, the image display device is a reflection liquid crystal panel or a mirror-reflection optical modulator, and the image display device has a roughened reflecting surface.

The present invention disposes a scattering member in an optical path between the image display device and the projection lens to scatter light forming an image formed by the image display device. The scattering member may be disposed near the image display device.

When the image display device is a transmission liquid crystal panel, the scattering member is one of the following members. (1) An exit dustproof glass plate having a haze value greater than that of an entrance dustproof glass plate, (2) a diffusing sheet adhesively attached to an exit dustproof glass plate, (3) a diffusing plate interposed between a transmission liquid crystal panel and an exit polarizing plate, (4) an exit polarizing plate having a haze value greater than that of an entrance polarizing plate and (5) a diffusing sheet adhesively attached to the entrance or the exit surface of a dichroic prism for synthesizing red, blue and green images emitted by a plurality of transmission liquid crystal panels.

When the image display device is a reflection liquid crystal panel, one of or a combination of some of the following members is used. (1) A dustproof glass plate having a haze value greater than that of a general dustproof glass plate for protecting the reflection liquid crystal panel, (2) a diffusing sheet adhesively attached to the surface of a dustproof glass plate and (3) a diffusing sheet adhesively attached to the exit or the entrance surface of a beam splitter.

When the image display device is a mirror-reflection optical modulator having a plurality of mirrors, a dust glass plate having a haze value greater than that of a general dustproof glass plate as the diffusing member.

According to the present invention, the deterioration of image quality due to, for example, speckle noise or the like can be suppressed when an image modulator is used.

DETAILED DESCRIPTION OF THE PREFERRED EMBODIMENTS

Preferred embodiments of the present invention will be described with reference to the accompanying drawings.

Figure 1:
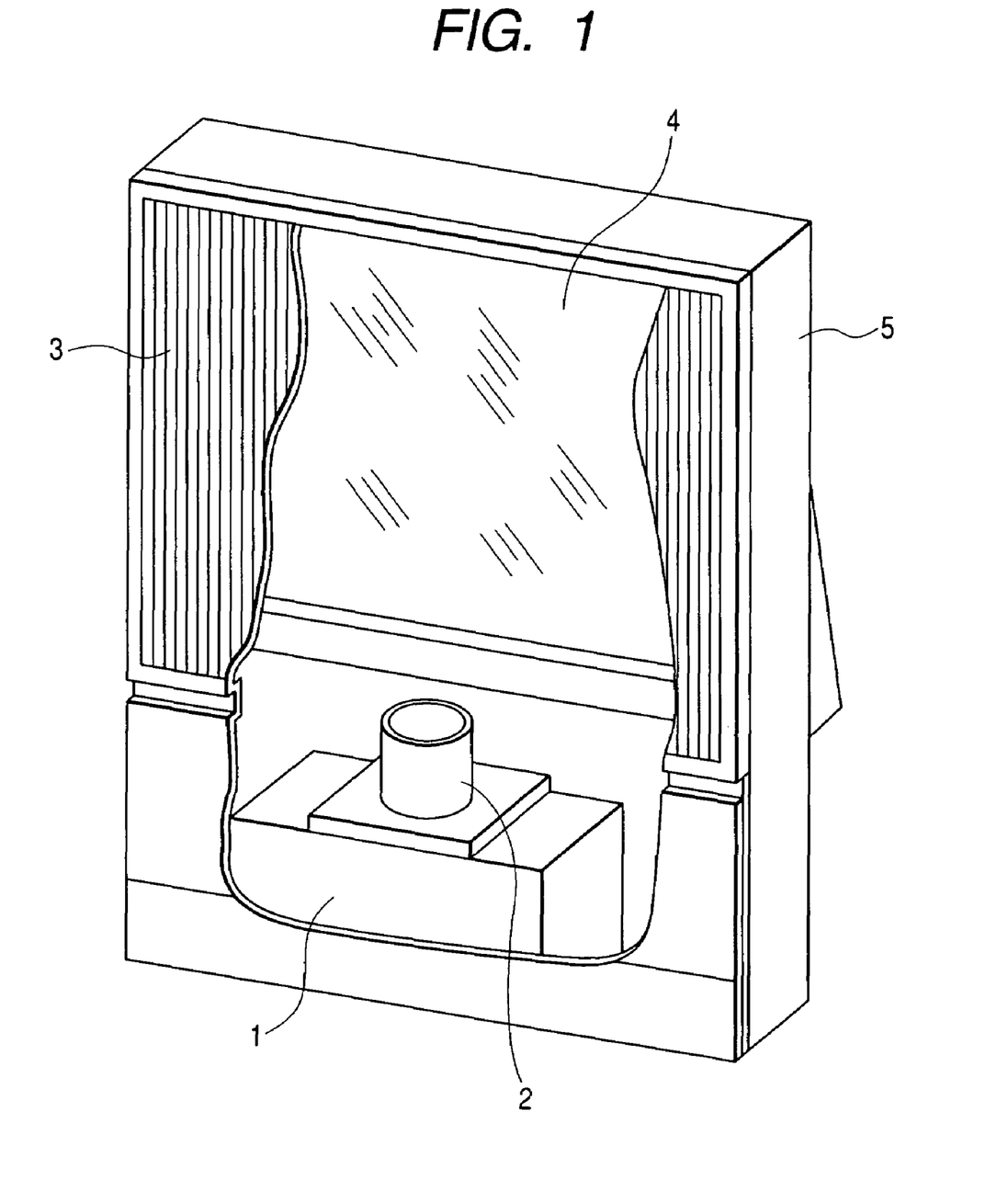
FIG. 1 is a partly cutaway perspective view of an image display apparatus in a first embodiment according to the present invention.

Referring to FIG. 1 showing an image display apparatus in a first embodiment according to the present invention is a partly cutaway perspective view, an image generator 1 includes a projection cathode-ray tube or a reflection or transmission liquid crystal panel, an image modulator, such as a mirror reflection optical modulator provided with a plurality of small mirrors, and an illuminating system including a lamp. The image generator 1 displays a small image. The small image is projected through a projection lens 2 on a rear projection screen 3. Generally, projection distance is long and hence a reflecting mirror 4 is disposed in an optical path between the projection lens 2 and the rear projection screen 3 to form the image display apparatus in a small longitudinal dimension. The image generator 1, the projection lens 2, the rear projection screen 3 and the reflecting mirror 4 are fixedly held at predetermined positions, respectively, in a cabinet 5.

Figure 2:
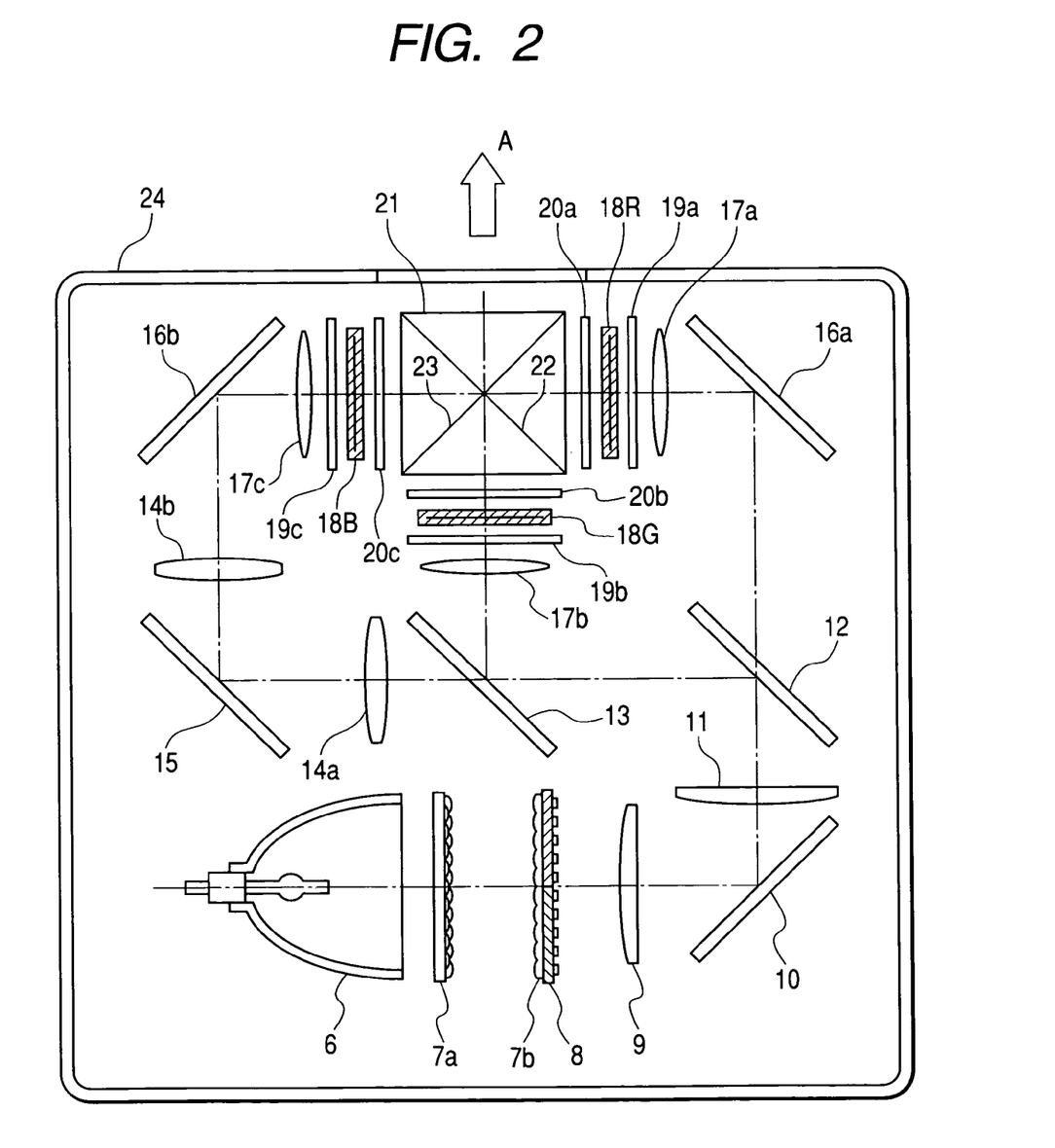
FIG. 2 is a typical view of an image generator using the transmission liquid crystal panel included in the image display apparatus shown in FIG. 1.

Referring to FIG. 2 showing the image generator 1 including a transmission liquid crystal panel according to the present invention in a typical view, light emitted by a lamp 6, namely, a light source, falls on a multilens unit consisting of an entrance multilens array 7a and an exit multilens array 7b. The multilens unit makes the distribution of the incident light uniform. A beam splitter 8 transmits light beams of the same polarization direction. A condenser lens 9 gathers the light beams transmitted by the beam splitter 8. A first mirror 10 is used to form the image generator 1 in a small overall size. The first mirror 10 reflects the light beams gathered by the condenser lens 9 to change the traveling direction of the light beams. The light beams reflected by the first mirror 10 fall on a first collimator lens 11 for focusing the light emitted by the lamp 6 on panels, which will be described later. A first dichroic mirror 12 transmits red light beams and reflects blue and green light beams of the light beams traveled through the first collimator lens 11. A second dichroic mirror 13 transmits the blue light beam reflected by the first dichroic mirror 12 and reflects the green light beam reflected by the first dichroic mirror 12. A relay lens unit including a first relay lens 14a and a second relay lens 14b is disposed on a blue optical path for the blue light beam longer than red and green optical paths for the red and the green light beam. A second mirror 15 disposed between the relay lenses 14a and 14b reflects the blue light beam traveled through the second dichroic mirror 13 to change the direction of the blue light beam. A third mirror 16a and a fourth mirror 16b are placed on the red and the blue optical path for the red and the blue light beam, respectively, to change the respective traveling directions of the red and the blue light beam such that the red and the blue light beam fall on a red liquid crystal panel 18R and a blue liquid crystal panel 18B, respectively. A second collimator lens 17a, a third collimator lens 17b and a fourth collimator lens 17c are placed in the red, the green and the blue optical path, respectively. The second collimator lens 17a, the third collimator lens 17b and the fourth collimator lens 17c work in cooperation with the first collimator lens 11 to focus the light emitted by the lamp 6 on panels, which will be described later. The red, the green and the blue light beam reflected by the third mirror 16a, the second dichroic mirror 13 and the fourth mirror 16b fall on the red liquid crystal panel 18R, the green liquid crystal panel 18G and the blue liquid crystal panel 18B, respectively. The red liquid crystal panel 18R for displaying red images is combined with a first entrance polarizing plate 19a and a first exit polarizing plate 20a. Similarly, the green liquid crystal panel 18G for displaying green images is combined with a second entrance polarizing plate 19b and a second exit polarizing plate 20b. The blue liquid crystal panel 18B for displaying blue images is combined with a third entrance polarizing plate 19c and a third exit polarizing plate 20c. The light beams traveled through the exit polarizing plates 20a, 20b and 20c fall on a dichroic prism 21, namely, optical modulator. The dichroic prism 21 includes a red light reflecting film 22 and a blue light reflecting film 23. The red light reflecting film 22 reflects the red light beam passed through the red liquid crystal panel 18R in the direction of the arrow A toward a projection lens, not shown.

The blue light reflecting film 23 reflects the blue light beam passed through the blue liquid crystal panel 18B in the direction of the arrow A toward the projection lens. The green light beam passed through the green liquid crystal panel 18G passes through the red light reflecting film 22 and the blue light reflecting film 23 and travels in the direction of the arrow A toward the projection lens. Those optical components are housed in the cabinet 24.

Figure 3:
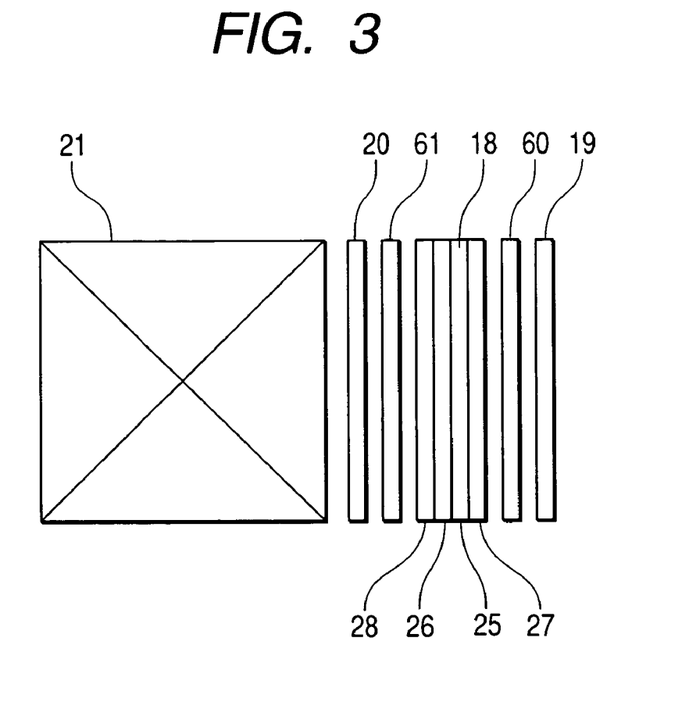
FIG. 3 is a view of a unit relating to the present invention extracted from FIG. 2 showing the image generator according to the present invention in the typical view.

FIG. 3 shows a unit included in the image generator 1 in the first embodiment according to the present invention in a typical view, in which parts corresponding to those shown in FIG. 2 are denoted by the same reference characters. The red, the green and the blue optical path shown in FIG. 2 are basically the same in construction and function, and hence only one of those optical paths is shown in FIG. 3. The liquid crystal panel 18 consists of a TFT substrate 25 and an opposite substrate 26, and is protected by an entrance dustproof glass plate 27 and an exit dustproof glass plate 28. A first viewing angle enlarging film 60 is interposed between the liquid crystal panel 18 and the entrance polarizing plate 19. A second viewing angle enlarging film 61 is interposed between the liquid crystal panel 18 and the exit polarizing plate 20. Each of the first viewing angle enlarging film 60 and the second viewing angle enlarging film 61 is a viewing angle enlarging film formed, for example, by coating a transparent carrier with a discotic liquid crystal compound and crosslinking the discotic liquid crystal compound and generally used for enlarging the viewing angle of electron-flood-beam liquid crystal panel or a viewing angle-enlarging film equivalent to the same.

A prior art contrast improving film for improving the contrast of a liquid crystal panel is formed by coating a transparent carrier with a discotic liquid crystal compound and crosslinking the discotic liquid crystal compound. A technique using the contrast improving film improves the contract through the improvement of the orthogonality of the liquid crystal panel with the S-wave and the P-wave. This technique is effective in improving contrast, but not effective at all in reducing speckle noise. Although enlargement of viewing angle is not necessary for a liquid crystal panel included in a projection optical system, improvement of contrast is important for such a liquid crystal panel. Therefore, a viewing angle enlarging film developed for the enlargement of viewing angle is used for improving contrast. The viewing angle enlarging film and the contrast improving film are formed from the same materials. The viewing angle enlarging film and the contrast improving film are different from each other. Whereas the viewing angle enlarging film is designed so that contrast inversion may not occur in a wide viewing angle range, the contrast improving film is designed so as to improve the orthogonality of the liquid crystal panel with the S-wave and the P-wave in a narrow viewing angle range. The viewing angle enlarging film corrects light not to improve contrast, but to enlarge viewing angle. The contrast improving film according to the present invention is black and cuts oblique light by a correction plates to prevent light leakage. The viewing angle enlarging film according to the present invention is white and corrects image light to make oblique light pass the correction plates.

When the viewing angle of the liquid crystal panel 18 is enlarged by placing the viewing angle enlarging films 60 and 61 on the opposite sides of the liquid crystal panel 18 as shown in FIG. 3, the collimation of the light beam transmitted by the liquid crystal panel 18 can be eased. Consequently, the present invention is able to reduce speckle noise that appears on the rear projection screen 3.

A unit included in an image generator in a second embodiment according to the present invention will be described with reference to FIG. 4, in which parts like or corresponding to those shown in FIG. 3 are denoted by the same reference characters. A liquid crystal panel 18 consists of a TFT substrate 25 and an opposite substrate 26, and is protected by an entrance dustproof glass plate 27 and an exit dustproof glass plate 28. The exit dustproof glass plate 28 has a haze value greater than that of the entrance dustproof glass plate 27, and serves as a scattering member for scattering image light. Generally, it is desirable that both the entrance and the exit dustproof glass plate have a high transmittance. However, if it is possible that speckle noise is generated, the exit dustproof glass plate 28 having a high haze value is used. Thus, speckle noise that appears on the rear projection screen 3 can be reduced by greatly scattering the light transmitted by the liquid crystal panel 18. Speckle noise can be thus reduced by making light beams that cause speckle noise fall on the diffusing member of the rear projection screen 3 from irregular directions to make interference between the light beams difficult. Although it is possible that speckle noise is generated on the exit dustproof glass plate 28, this speckle noise scarcely causes a trouble because the exit dustproof glass plate 28 is very close to the image display part of the liquid crystal panel 18. However, polarization is disturbed by scattering and, consequently, the contrast of the image is deteriorated. Therefore, the haze value of the exit dustproof glass plate 28 must be determined such that the reduction of speckle noise and the deterioration of the contrast are properly balanced. The scattering of the image light that generates speckle noise to prevent speckle noise like that done by the present invention is more effective than the improvement of only the screen on which speckle noise appears directly like that done by prior art techniques mentioned in References 2 and 3. The exit dustproof glass plate 28 having a high haze value may be formed from glass containing a dispersed diffusing material or may be formed by coating a glass plate with a film of a binder containing a material having a low refractivity by spray coating.

Figure 4:
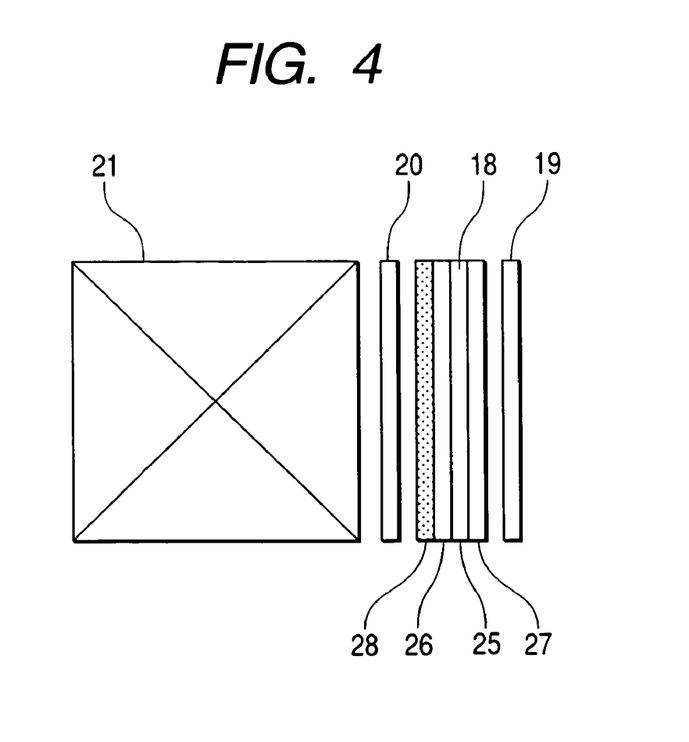
FIG. 4 is a view of a second embodiment according to the present invention.
Figure 5:
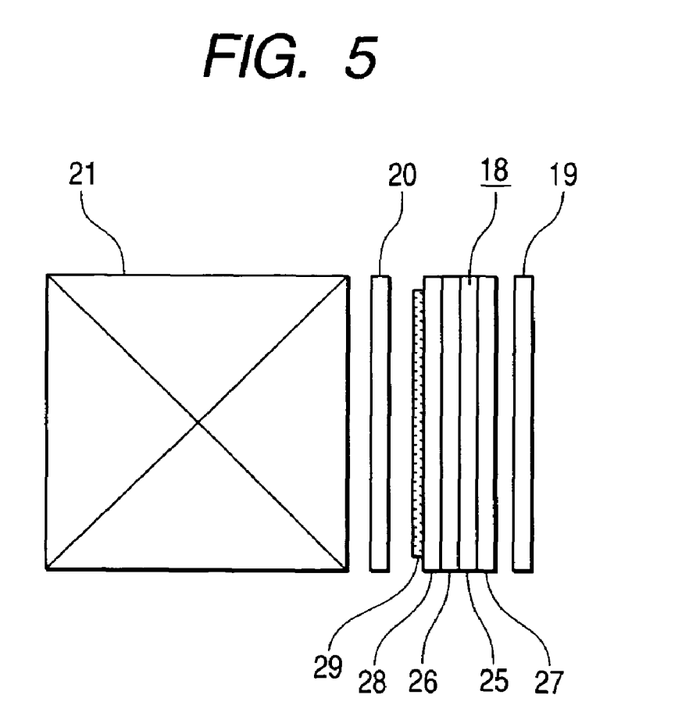
FIG. 5 is a view of a third embodiment according to the present invention.

A unit included in an image generator in a third embodiment according to the present invention will be described with reference to FIG. 5, in which parts like or corresponding to those shown in FIG. 4 are denoted by the same reference characters. Generally, a liquid crystal panel 18 is a common part and hence, in some cases, it is difficult to form a special unit as shown in FIG. 4. In such a case, an exit dustproof glass plate 28 provided with a diffusive sheet 29 adhesively attached to the surface of the exit dustproof glass plate 28 may be employed. If the liquid crystal panel 18 needs cooling, the diffusive sheet 29 may be formed so as to have a necessary strength, and the diffusive sheet 29 may be interposed between the liquid crystal panel 18 and an exit polarizing plate 20.

Figure 6:
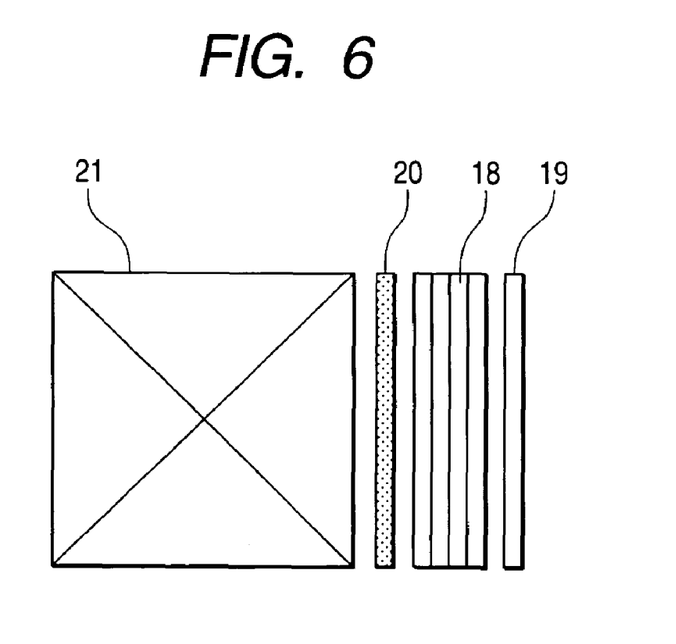
FIG. 6 is a view of a fourth embodiment according to the present invention.

A unit included in an image generator in a fourth embodiment according to the present invention will be described with reference to FIG. 6, in which parts like or corresponding to those shown in FIG. 4 are denoted by the same reference characters. An exit polarizing plate 20 has a haze value greater than that of an entrance polarizing plate 19 to use the exit polarizing plate 20 as a scattering member for scattering image light. Although a diffusing material contained in a polarizing plate decreases the degree of polarization, the use of the diffusive exit polarizing plate 20 is effective in reducing the number of component parts. The exit polarizing plate 20 may be formed by bonding a diffusive sheet to a polarizing plate as mentioned in connection with FIG. 5. Polarized light is not disturbed when such a polarizing plate is disposed with the polarizing plate facing the entrance side and the diffusive sheet facing the exit side.

Figure 7:
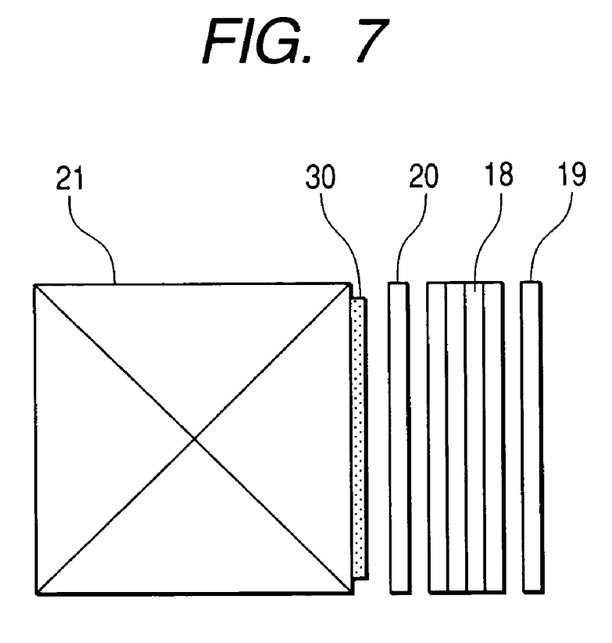
FIG. 7 is a view of a fifth embodiment according to the present invention.

A unit included in an image generator in a fifth embodiment according to the present invention will be described with reference to FIG. 7, in which parts like or corresponding to those shown in FIG. 4 are denoted by the same reference characters. A diffusive sheet 30, namely, a scattering member, is attached adhesively to an entrance surface of a dichroic prism 21. Separation of a diffusive layer from a liquid crystal panel 18 deteriorates resolution. Since a diffusive layer is outside two polarizing plates, the deterioration of contrast due to the disturbance of polarized light by the scattering effect of a diffusing material does not occur. The diffusive sheet 30 may be formed so as to have a necessary strength, and the diffusive sheet 30 may be interposed between the liquid crystal panel 18 and the dichroic prism 21.

Figure 8:
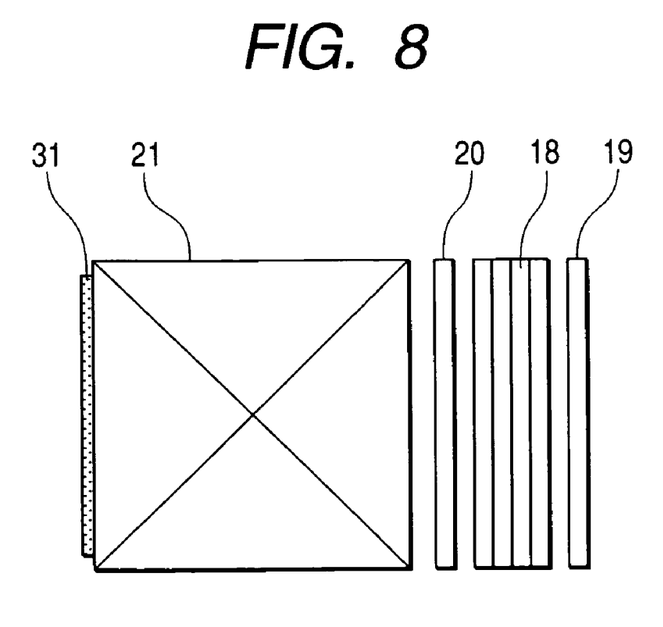
FIG. 8 is a view of a sixth embodiment according to the present invention.

A unit included in an image generator in a sixth embodiment according to the present invention will be described with reference to FIG. 8, in which parts like or corresponding to those shown in FIG. 4 are denoted by the same reference characters. A diffusive sheet 31, namely, a scattering member, is adhesively attached to the exit surface of a dichroic prism 21. Although the separation of a diffusive layer from a liquid crystal panel deteriorates resolution, the red, the green and the blue light beam can be diffused by the single diffusive sheet 31 because the red, the green and the blue light beam pass the exit surface. The diffusive sheet 31 may be formed so as to have a necessary strength and disposed apart from the dichroic prism 21.

Figure 9:
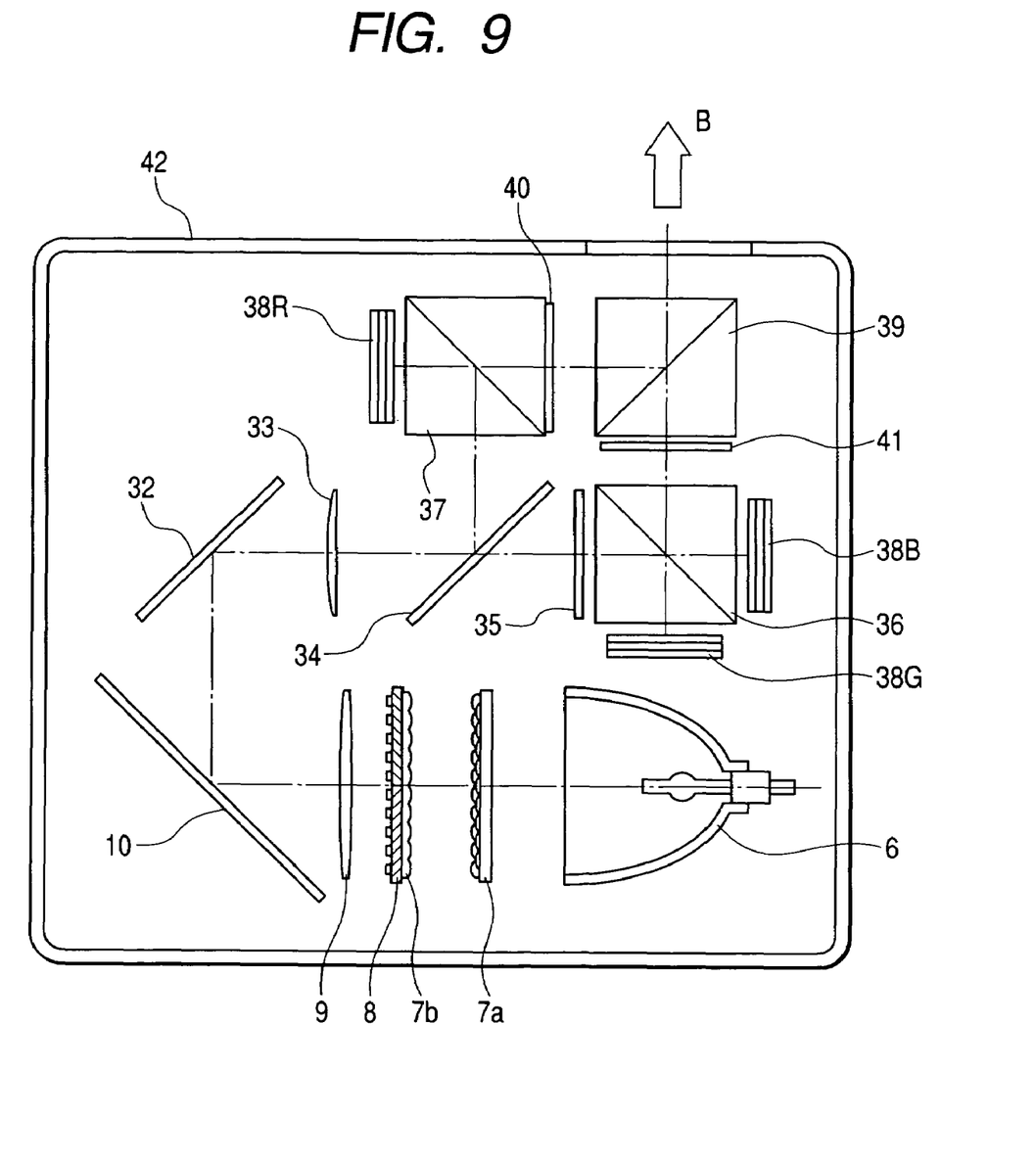
FIG. 9 is a typical view of an image generator using a reflection liquid crystal panel included in an image display apparatus according to the present invention in a modification.

FIG. 9 is a typical view of an image generator using a reflection liquid crystal panel included in an image display apparatus according to the present invention in a modification of the foregoing image generator 1. Light emitted by a lamp 6, namely, a light source, falls on a multilens unit consisting of an entrance multilens array 7a and an exit multilens array 7b. The multilens unit makes the distribution of the incident light uniform. A beam splitter 8 polarizes the light passed the multilens unit in S-polarized light beams. A condenser lens 9 gathers the S-polarized light beams transmitted by the beam splitter 8. A first mirror 10 and a second mirror 32 are used to form the image generator 1 in a small overall size. The first mirror 10 and the second mirror 32 reflect the light beams gathered by the condenser lens 9 to change the traveling direction of the light beams. The light beams reflected by the first mirror 10 and the second mirror 32 fall on a first collimator lens 33 for focusing the light emitted by the lamp 6 on panels, which will be described later. A dichroic mirror 34 transmits blue light beams and green light beams and reflects red light beams of the light beams traveled through the first collimator lens 33. A first wavelength-selective wave plate 35 changes only the blue light beam, namely, S-polarized light beam, transmitted by the dichroic mirror 34 into a P-polarized light beam. The green light beam, namely, the S-polarized light beam, and the blue light beam, namely, the P-polarized light beam, fall on a first beam splitter prism 36. The first beam splitter prism 36 reflects the green light beam (S-polarized light beam) toward a green reflection liquid crystal panel 38G for the green light beam, and transmits the blue light beam (P-polarized light beam) toward a blue reflection liquid crystal panel 38B for the blue light beam. The red light beam (S-polarized light beam) reflected by the dichroic mirror 34 is reflected again by a second beam splitter prism 37 toward a red reflection liquid crystal panel 38R for the red light beam.

An optical modulator 39 is a third beam splitter prism capable of synthesizing optical images provided by the red reflection liquid crystal panel 38R, the green reflection liquid crystal panel 38G and the blue reflection liquid crystal panel 38B. A half-wave plate 40 is attached to the exit surface of the second beam splitter prism 37. The S-polarized red light beam is converted into an P-polarized red light beam by the second beam splitter prism 37, and the P-polarized red light beam is converted into an S-polarized red light beam by the half-wave plate 40. The S-polarized red light beam falls on the third beam splitter prism 39. The third beam splitter prism 39 reflects the incident red light beam in the direction of the arrow B. The S-polarized green light beam fallen on the green reflection liquid crystal panel 38G is converted into a P-polarized green light beam by the first beam splitter prism 36, and the P-polarized green light beam travels through the third beam splitter prism 39 in the direction of the arrow B. The P-polarized blue light beam fallen on the blue reflection liquid crystal panel 38B is converted into an S-polarized blue light beam, the S-polarized blue light beam is reflected by the first beam splitter prism 36 and is converted into a P-polarized blue light beam by a second wavelength-selective wave plate 41 that converts only the blue light beam from an S-polarized light beam into a P-polarized light beam. The P-polarized blue light beam travels through the third beam splitter prism 39 in the direction of the arrow B. Those optical components are housed in the cabinet 24.

Figure 10:
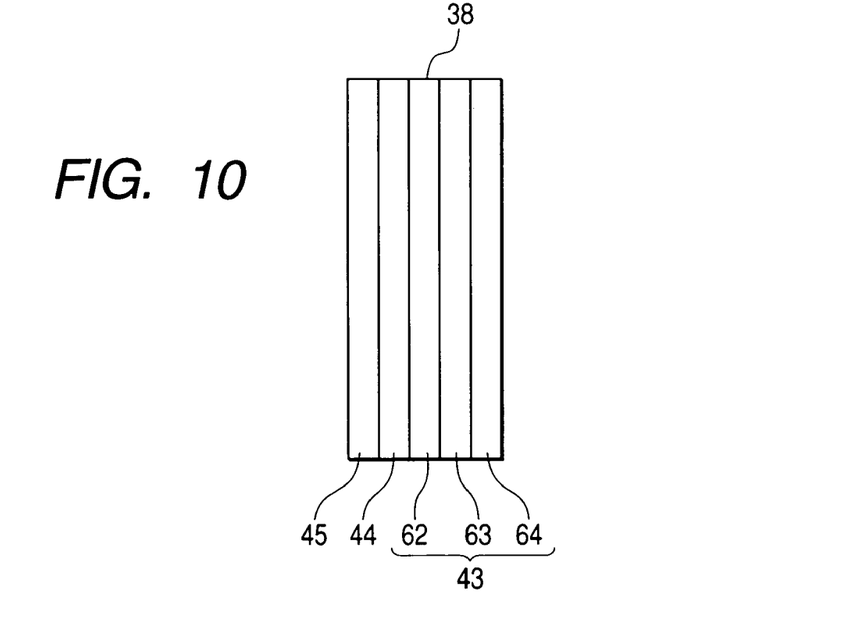
FIG. 10 is a typical view of a reflection liquid crystal panel according to the present invention.

FIG. 10 is a typical view of the reflection liquid crystal panel 38 employed in the image generator included in the image display apparatus according to the present invention. Since the red liquid crystal panel 39R, the green liquid crystal panel 38G and the blue reflection liquid crystal panel 38B are basically the same in construction and function, the reflection liquid crystal panel 38 shown in FIG. 10 is any one of the reflection liquid crystal panels 38R, 38G and 38B. Referring to FIG. 10, the reflection liquid crystal panel 38 consists of a display unit 43, a transparent electrode layer 44, and a dustproof glass plate 45 covering the transparent electrode layer 44. The display unit 43 consists of a silicon wafer 64, a reflecting mirror 63 having a rough surface, and a liquid crystal layer 62. Generally, the surface of the reflecting mirror 63 is finished in the smoothest possible surface because the surface having a higher reflectance has a higher reflecting ability. However, it is expected that speckle noise is generated, the surface of the reflecting mirror 63 is roughened. Consequently, speckle noise that appears on the rear projection screen 3 can be reduced by greatly scattering light emerging from the reflection liquid crystal panel 38.

Figure 11:
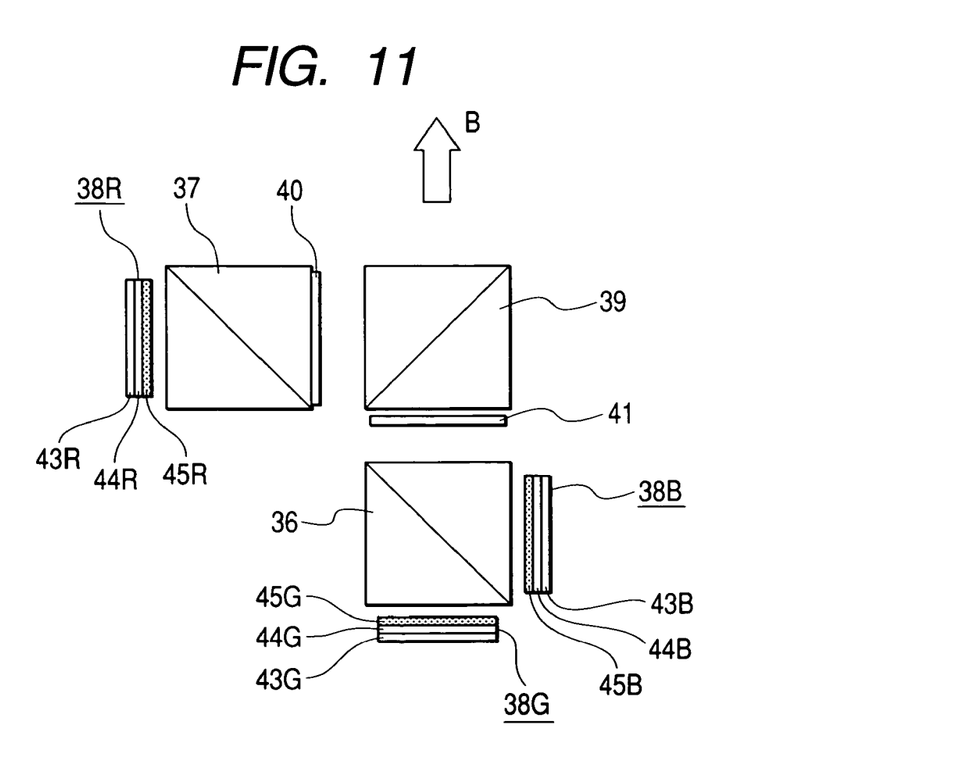
FIG. 11 is a view of a unit relating with the present invention extracted from FIG. 9 showing the image generator according to the present invention in the typical view.

FIG. 11 is a view of a unit relating to the present invention extracted from FIG. 9 showing the image generator. In FIG. 11, parts like or corresponding to those shown in FIG. 9 are denoted by the same reference characters. The red reflection liquid crystal panel 38R, the green reflection liquid crystal panel 38G and the blue reflection liquid crystal panel 38B have display units 43R, 43G and 43B and transparent electrode layers 44R, 44G and 44B, and dustproof glass plates 45R, 45G and 45B covering the transparent electrode layers 44S, 44G and 44B, respectively. The dustproof glass plates 45R, 45G and 45B has a haze value greater than those of general dustproof glass plates to use the dustproof glass plates 45R, 45G and 45B also as scattering members. The dustproof glass plate 45R, 45G and 45B having a high haze value may be formed from glass containing a dispersed diffusing material or may be formed by coating a glass plate with a film of a binder containing a material having a low refractivity by spray coating.

Figure 12:
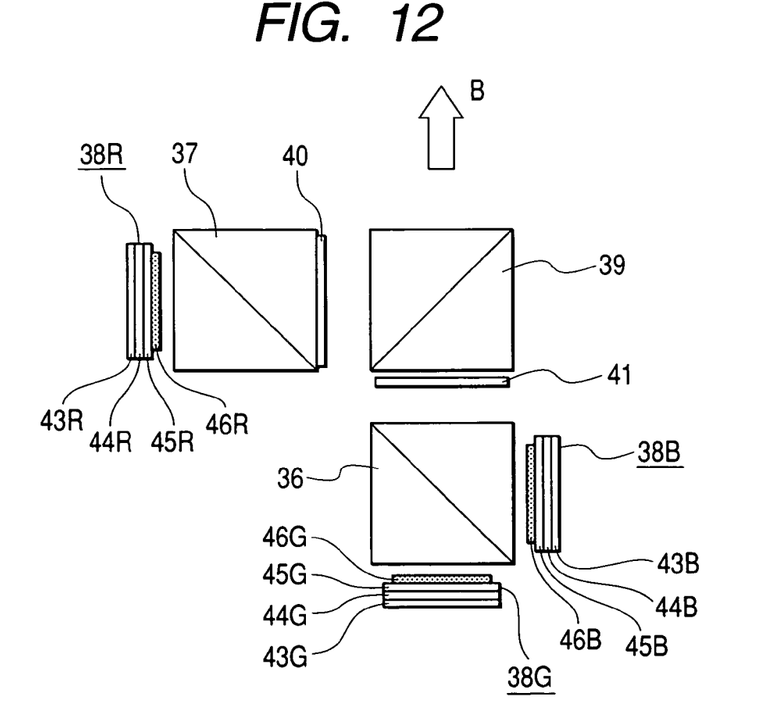
FIG. 12 is a view of a seventh embodiment according to the present invention.

A seventh embodiment according to the present invention will be described with reference to FIG. 12, in which parts like or corresponding to those shown in FIG. 11 are denoted by the same reference characters. Generally, a reflection liquid crystal panel 38 is a common part and hence, in some cases, it is difficult to form special units as shown in FIGS. 10 and 11. In such a case, diffusive sheets 46R, 46G and 46B may be attached adhesively to the surfaces of exit dustproof glass plates 45R, 45G and 45B covering the reflection liquid crystal panels 38R, 38G and 38B, respectively, as shown in FIG. 12. The diffusive sheets 46R, 46G and 46B serve as scattering members, respectively. If the reflection liquid crystal panels 38R, 38G and 38B need cooling, the diffusive sheets 46R, 46G and 46B may be formed so as to have a necessary strength, and may be formed so as to have a necessary strength, and the diffusive sheet 46R may be interposed between the reflection liquid crystal panel 38R and a beam splitter prism 37, and the diffusive sheets 46G and 46B may be interposed between the reflection liquid crystal panel 38G and a beam splitter prism 36 and between the reflection liquid crystal panel 38B and the beam splitter prism 36, respectively.

Figure 13:
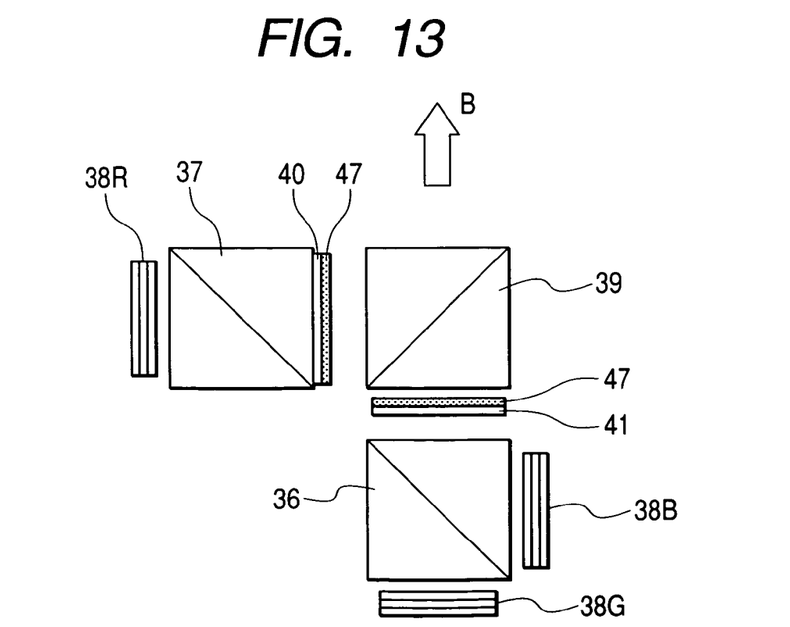
FIG. 13 is a view of an eighth embodiment according to the present invention.

An eighth embodiment according to the present invention will be described with reference to FIG. 13, in which parts like or corresponding to those shown in FIG. 11 are denoted by the same reference characters. Diffusive sheets 47, namely, scattering members, are disposed on the exit side of beam splitter prisms 36 and 37. The diffusive sheets 47 disposed behind the beam splitter prisms 36 and 37, which separates image light from unnecessary light, are more effective then those shown in FIG. 12 in improving contrast. Since the diffusive sheets 47 are spaced from the reflection liquid crystal panels 38, resolution is deteriorated. Although the diffusive sheets 47 are adhesively attached to the respective exit surfaces of a half-wave plate 40 and a second wavelength-selective wave plate 41 in the eighth embodiment, the diffusive sheets 47 may be adhesively attached to the respective entrance surfaces of a half-wave plate 40 and a second wavelength-selective wave plate 41 for the same effect. The diffusive sheets 47 may be formed so as to have a necessary strength and disposed apart from the half-wave plate 40 and the second wavelength-selective wave plate 41.

Figure 14:
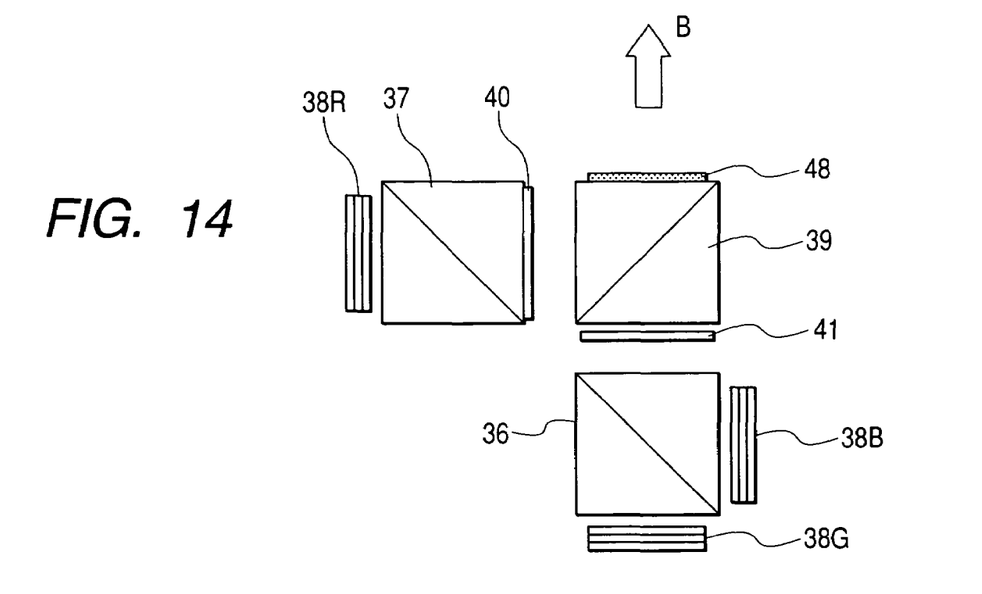
FIG. 14 is a view of a ninth embodiment according to the present invention.

A ninth embodiment according to the present invention will be described with reference to FIG. 14, in which parts like or corresponding to those shown in FIG. 11 are denoted by the same reference characters. The eighth embodiment is characterized by a diffusive sheet 48, namely, scattering member, adhesively attached to the entrance surface of a third beam splitter prism 39. Since the diffusive sheet 48 for separating image light from unnecessary light is disposed below beam splitter prisms 36 and 37 and the third beam splitter prism 39, the contrast ability of the ninth embodiment is higher than that of the eighth embodiment shown in FIG. 13. However, resolution is further deteriorated because the diffusive sheet 48 is spaced a long distance apart from the reflection liquid crystal panels 38.

The image display apparatuses in the preferred embodiments shown in FIGS. 10 to 14 have both advantages and disadvantages in contrast ability, resolution and the number of parts. Therefore, those image display apparatuses may be selectively used taking into consideration the total ability of the image display apparatuses.

Figure 15:
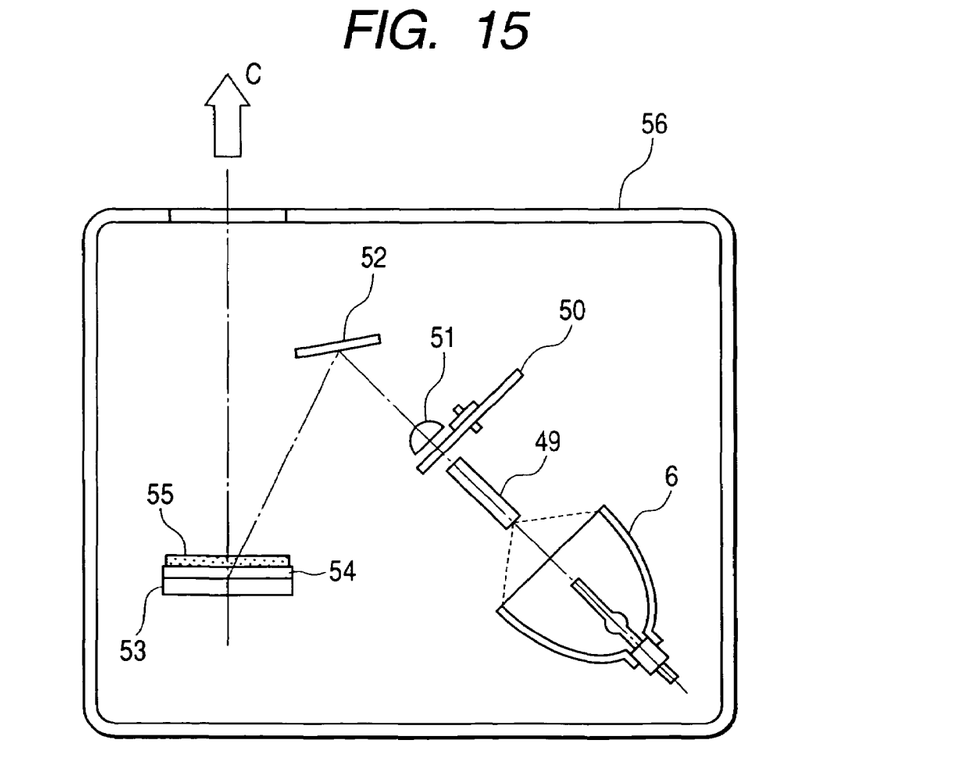
FIG. 15 is a typical view of an image generator using a mirror-reflection optical modulator according to the present invention in a modification.

FIG. 15 is a typical view of an image generator using a mirror-reflection optical modulator according to the present invention in a modification. Light emitted by a lamp 6 is uniformed by a light pipe 49. Light emerging from the light pipe 49 is periodically separated into red, green and blue light beams by a color wheel 50. Then, the right, the green and the blue light beam travel through a condenser lens 51, and are reflected toward a mirror-reflection optical modulator 53 by a mirror 52 used for forming an image generator 1 in a small size. The mirror-reflection optical modulator 53 is protected by a dustproof glass plate 54. A diffusive sheet 55 is adhesively attached to the exit surface of the dustproof glass plate 54. Those optical components are housed in a cabinet 56. This image generator 1 is characterized in that the dustproof glass plate 54, the diffusive sheet 55 or the combination of the dustproof glass plate 54 and the diffusive sheet 55 is used as a scattering member. Since the mirror-reflection optical modulator 53 does not deal with polarized light, the diffusive sheet 55 may be disposed at any position on the exit side of the mirror-reflection optical modulator 53. It is the simplest method of using the diffusive sheet 55 to adhesively attach the diffusive sheet 55 to the exit surface of the dustproof glass plate 54. Since all the pixels of the mirror-reflection optical modulator 53 are minute mirrors, not shown, the surfaces of all the minute mirrors may be roughened. The mirror-reflection optical modulator 53 having the minute mirrors having roughened surfaces is a special type and there are many difficulties in manufacturing such a special mirror-reflection optical modulator. However, since, such a mirror-reflection optical modulator causes secondary scattering scarcely, the deterioration of contrast is limited to the least extent and resolution is not deteriorated.

Although the image display devices provided respectively with the transmission liquid crystal panels, the reflection liquid crystal panels and the mirror-reflection optical modulator have been described, the same principle of speckle noise reduction applies to other image display devices. Therefore, it goes without saying that the present invention is applicable to image display devices other than those specifically described herein.

What is claimed is:

1. An image display apparatus comprising:
   a light source;
   an image display device including a separate image display element for modulating each of red, green and blue light emitted by the light source along respective optical paths;
   a projection lens for projecting an image formed by the image display device on a screen as an enlarged image; and
   a scattering member disposed in the optical path between each of the image display elements and the projection lens to scatter light from each of the image display elements forming the image;
   wherein the image display device includes three liquid crystal panels for modulating red, green and blue light beams included in the light emitted by the light source, and the scattering member is positioned on a dichroic prism which is disposed in each optical path between each of the three liquid crystal panels and the projection lens for synthesizing optical images formed by the three liquid crystal panels.

2. The image display apparatus according to claim 1 wherein the scattering member is bonded to an entrance surface of the dichroic prism.

3. The image display apparatus according to claim 1 wherein the scattering member is bonded to an exit surface of the dichroic prism.

4. An optical projector comprising:
an image display device including three image display elements for modulating each of red, green and blue light emitted by a light source along respective optical paths;
an optical element for projecting an image formed by the image display device as an enlarged image; and
a scattering member disposed in the optical path between each of the three image display elements and the optical element to scatter light forming the image;
wherein the scattering member is positioned on a dichroic prism which is disposed in each optical path between each of the three image display elements and the optical element for synthesizing optical images formed by the three image display elements.

5. The optical projector according to claim 4 further comprising:
a dichroic prism; and
a diffusive sheet providing the scattering member attached to each entrance surface of the dichroic prism;
wherein the image display device includes a plurality of transmission liquid crystal panels capable of forming red, green and blue images by modulating red, green and blue light; and
wherein the dichroic prism synthesizes the red, the green and the blue image formed by the plurality of transmission liquid crystal panels.

6. An optical projector comprising:
an image display device including three transmission liquid crystal panels for modulating each of red, green and blue light emitted by a light source along respective optical paths;
an optical element for projecting an image formed by the image display device as an enlarged image; and
a scattering member disposed in the optical path between each of the three transmission liquid crystal panels and the optical element to scatter light forming the image,
wherein the three transmission liquid crystal panels are protected at least by an entrance dustproof glass plate and an exit dustproof glass plate serving also as the scattering member, and wherein the exit dustproof glass plate has a haze value greater than the haze value of the entrance dustproof glass plate.

7. An optical projector comprising:
an image display device including three transmission liquid crystal panels for modulating each of red, green and blue light emitted by a light source along respective optical paths;
an optical element for projecting an image formed by the image display device as an enlarged image; and
a scattering member disposed in the optical path between each of the three transmission liquid crystal panels and the optical element to scatter light forming the image,
wherein the three transmission liquid crystal panels are protected at least by an exit dustproof glass plate also functioning as the scattering member, and a diffusive sheet is attached adhesively to a surface of the exit dustproof glass plate.

8. An optical projector comprising:
an image display device including three transmission liquid crystal panels for modulating each of red, green and blue light emitted by a light source along respective optical paths;
an optical element for projecting an image formed by the image display device as an enlarged image; and
a scattering member disposed in the optical path between each of the three transmission liquid crystal panels and the optical element to scatter light forming the image,
wherein the image display device has three exit polarizing plates, and the scattering member is provided by a diffusing plate interposed between each of the three transmission liquid crystal panels and each of the three exit polarizing plates.

9. An optical projector comprising:
an image display device including for modulating each of red, green and blue light emitted by a light source along respective optical paths;
an optical element for projecting an image formed by the image display device as an enlarged image;
a scattering member disposed in the optical path between each of the three image display elements and the optical element to scatter light forming the image, a dichroic prism;
a diffusive sheet providing the scattering member is attached adhesively to an exit surface of the dichroic prism;
wherein the image display device includes a plurality of transmission liquid crystal panels capable of forming red, green and blue images by modulating red, green and blue light; and
wherein the dichroic prism synthesizes the red image, the green image and the blue image formed by the plurality of transmission liquid crystal panels.

10. An optical projector comprising:
an image display device including three reflection liquid crystal panels for modulating each of red, green and blue light emitted by a light source along respective optical paths;
an optical element for projecting an image formed by the image display device as an enlarged image; and
a scattering member disposed in the optical path between each of the three reflection liquid crystal panels and the optical element to scatter light forming the image,
wherein the three reflection liquid crystal panels are protected at least by a dustproof glass plate serving also as the scattering member.

11. An optical projector comprising:
an image display device including three reflection liquid crystal panels for modulating each of red, green and blue light emitted by a light source along respective optical paths;
an optical element for projecting an image formed by the image display device as an enlarged image; and
a scattering member disposed in the optical path between each of the three reflection liquid crystal panels and the optical element to scatter light forming the image,
wherein the three reflection liquid crystal panels are protected at least by a dustproof glass plate, and a diffusive sheet serving as the scattering member is attached adhesively to a surface of the dustproof glass plate.

12. The optical projector according to claim 11, wherein the image display device comprises the three reflection liquid crystal panels provided with plural beam splitters, and a diffusive sheet serving as the scattering member is attached adhesively to at least one exit surface of the plural beam splitter nearest to the reflection liquid crystal panel.

13. An optical projector comprising:
- an image display device including a reflection liquid crystal panel for modulating each of red, green and blue light emitted by a light source along respective optical paths;
- an optical element for projecting an image formed by the image display device as an enlarged image; and
- a scattering member disposed in the optical path between the reflection liquid crystal panel and the optical element to scatter light forming the image, wherein the image display device comprises a mirror-reflection optical modulator protected at least by a dustproof glass plate serving also as the scattering member.

14. An optical projector comprising:
- an image display device including a reflection liquid crystal panel for modulating each of red, green and blue light emitted by a light source along respective optical paths;
- an optical element for projecting an image formed by the image display device as an enlarged image; and
- a scattering member disposed in the optical path between the reflection liquid crystal panel and the optical element to scatter light forming the image, wherein the image display device comprises a mirror-reflection optical modulator protected at least by a dustproof glass plate, and a diffusive sheet serving also as the scattering member is attached adhesively to a surface of the dustproof glass plate.

15. An optical projector comprising:
- an image display device including a reflection liquid crystal panel for modulating each of red, green and blue light emitted by a light source along respective optical paths;
- an optical element for projecting an image formed by the image display device as an enlarged image; and
- a scattering member disposed in the optical path between the reflection liquid crystal panel and the optical element to scatter light forming the image, wherein the image display device comprises a mirror-reflection optical modulator protected at least by a dustproof glass plate, and a diffusive plate serving also as the scattering member is interposed between the mirror-reflection optical modulator and a projection lens serving as the optical element.

16. An image display apparatus comprising:
- an image display device;
- an optical element for projecting an image formed by the image display device as an enlarged image;
- a rear projection screen upon which the optical element projects the enlarged image; and
- a scattering member capable of scattering image light to reduce speckle noise which member is disposed near the image display device;
- wherein the image display device includes three liquid crystal panels for modulating red, green and blue light beams included in the light emitted by a light source, and the scattering member is positioned on a dichroic prism which is disposed in each optical path between each of the three liquid crystal panels and the optical element for synthesizing optical images formed by the three liquid crystal panels.

17. The image display apparatus according to claim 16 wherein the image display device comprises a transmission liquid crystal panel.

18. The image display apparatus according to claim 16 wherein the image display device comprises a reflection liquid crystal panel.

19. The image display apparatus according to claim 16 wherein the image display device comprises a mirror reflection optical modulator.

* * * * *